United States Patent [19]

Ohta et al.

[11] Patent Number: 5,076,022
[45] Date of Patent: Dec. 31, 1991

[54] GRINDING MACHINE FOR GRINDING OUTER AND INNER SURFACES

[75] Inventors: Norio Ohta, Okazaki; Yoshio Wakazono, Nagoya, both of Japan

[73] Assignee: Toyoda Koki Kabushiki Kaisha, Kariya, Japan

[21] Appl. No.: 412,443

[22] Filed: Sep. 26, 1989

[30] Foreign Application Priority Data

Sep. 29, 1988 [JP] Japan .................. 63-24564

[51] Int. Cl.⁵ ............................................. B24B 49/00
[52] U.S. Cl. .................... 51/165.71; 51/165.74; 51/165.76; 51/165.77; 51/165.93
[58] Field of Search ........... 51/165.74, 165.75, 165.76, 51/165.77, 165.8, 165.93, 3, 166 T

[56] References Cited

U.S. PATENT DOCUMENTS

| | | | |
|---|---|---|---|
| 2,911,767 | 11/1959 | Sielemann | 51/166 T |
| 4,461,121 | 7/1984 | Motzer et al. | 51/166 T |
| 4,535,570 | 8/1985 | Ochiai et al. | 51/165.74 |
| 4,562,392 | 12/1985 | Davis | 318/572 |
| 4,755,949 | 7/1988 | Shiratori | 364/474 |
| 4,773,187 | 9/1988 | Ohta | 51/165.77 |

Primary Examiner—M. Rachuba
Attorney, Agent, or Firm—Oblon, Spivak, McClelland, Maier & Newstadt

[57] ABSTRACT

A grinding machine for grinding outer and/or inner surfaces of a workpiece which is provided on its indexable wheel head with an outer surface grinding wheel, inner surface grinding wheel and a measuring device having a touch probe engagable with a reference surface of the workpiece. A numerical controller having a memory for memorizing data indicating positional and angular relationships between the outer surface grinding wheel, the inner surface grinding wheel and the touch probe is provided. The numerical controller first indexes the measuring device to a location facing the workpiece, and moves the workpiece along its rotational axis until the measuring device outputs a touch signal. After that, the numerical controller calculates a moving amount of the workpiece for an outer grinding operation based upon data memorized in the memory, and moves the table by the calculated amount in order to grind the outer surface of the workpiece. When a inner surface of a workpiece is machined, the inner grinding wheel is indexed to a position facing the workpiece based upon the data indicating angular relationship, after the workpiece is positioned based upon the touch signal from the measuring device. Thereafter, the table is moved based upon data indicating positional relationship between the inner surface grinding wheel and the touch probe in order to locate the inner surface grinding wheel to a predetermined grinding starting position of the inner grinding operation.

4 Claims, 8 Drawing Sheets

| | |
|---|---|
| MACHINING PROGRAM | —MPA |
| MACHINING CONDITION | —MCA |
| DISTANCE A BETWEEN INDEX AXIS OF WHEEL HEAD AND GRINDING SURFACE OF OUTER SURFACE GRINDING WHEEL | —CDA1 |
| DISTANCE B BETWEEN INDEX AXIS OF WHEEL HEAD AND SIDE SURFACE OF OUTER SURFACE GRINDING WHEEL | —CDA2 |
| DISTANCE C BETWEEN INDEX AXIS OF WHEEL HEAD AND GRINDING SURFACE OF INNER SURFACE GRINDING WHEEL | —CDA3 |
| DISTANCE D BETWEEN INDEX AXIS OF WHEEL HEAD AND OUTER END SURFACE OF INNER SURFACE GRINDING WHEEL | —CDA4 |
| DISTANCE E BETWEEN INDEX AXIS OF WHEEL HEAD AND POINTED END OF TOUCH PROBE ALONG DIRECTION PERPENDICULAR TO ROTATIONAL AXIS OF WORKPIECE | —CDA5 |
| DISTANCE F BETWEEN INDEX AXIS OF WHEEL HEAD AND POINTED END OF TOUCH PROBE ALONG ROTATIONAL AXIS OF WORKPIECE | —CDA6 |
| APPROXIMATE DISTANCE G AND ACTUAL DISTANCE N BETWEEN INDEX AXIS OF WHEEL HEAD AND REFERENCE SURFACE OF WORKPIECE | —CDA7 |
| INDEX ANGLE $\theta_1$ OF WHEEL HEAD FOR OUTER SURFACE GRINDING WHEEL | —CDA8 |
| INDEX ANGLE $\theta_2$ OF WHEEL HEAD FOR INNER SURFACE GRINDING WHEEL | —CDA9 |
| INDEX ANGLE $\theta_3$ OF WHEEL HEAD FOR TOUCH PROBE | —CDA10 |

GRINDING MACHINE FOR GRINDING OUTER AND INNER SURFACES

BACKGROUND OF THE INVENTION

1. Field of the Invention

The present invention relates to a grinding machine capable of grinding outer and inner surfaces of workpieces and, more particularly, to a grinding machine provided, on its indexable wheel head, with an outer surface grinding wheel, an inner surface grinding wheel and a measuring device for detecting the position of a reference surface of a workpiece.

2. Description of the Prior Art

A known grinding machine for outer surface grinding is provided with a table movable along a horizontal direction, a spindle head mounted on the table so as to rotate a workpiece about an axis parallel to the moving direction of the table, a wheel head movable along a direction perpendicular to the moving direction of the table, an outer surface grinding wheel supported on the wheel head, and a measuring device having a touch probe engagable with a reference shoulder surface of the workpiece. In such grinding machine, the table is moved to cause the touch probe of the measuring device to engage with the reference surface of the workpiece, and the position of the table is detected when the touch probe engages with the reference surface. The table is then relatively moved from the detected position in accordance with a numerical control program so as to grind the outer surface of the workpiece. With this arrangement, the outer surface of the workpiece is accurately machined regardless of the positional deviation of the workpiece with respect to the table.

On the other hand, a known grinding machine capable of grinding both outer and inner surfaces is provided with an outer surface grinding wheel and a inner surface grinding wheel on its indexable wheel head.

In such grinding machines, however, it is difficult to grind inner surface precisely, if a position measuring device for detecting the axial position of a workpiece is not provided for the inner surface grinding wheel other than a position measuring device for the outer surface grinding wheel because the measuring device for the outer surface grinding wheel is mounted on the indexable wheel head at its front side at which the outer surface grinding wheel is also supported, and the inner surface grinding wheel is supported on the opposite side of the wheel head. Therefore, it is necessary to provide two position measuring devices in order to grind both inner and outer surfaces of the workpiece, so that the structure of the grinding machine becomes complex.

SUMMARY OF THE INVENTION

Accordingly, it is an object of the present invention to provide an improved grinding machine capable of grinding both outer and inner surfaces of workpieces accurately.

Another object of the invention is to provide an improved grinding machine of the character set forth above which is capable of precisely positioning workpieces with respect to both an outer surface grinding wheel and an inner surface grinding wheel with a common measuring device for detecting the position of reference surfaces of the workpieces.

Briefly, according to the present invention, there is provided a grinding machine for grinding outer and inner surfaces of workpieces, which has a measuring device mounted on its indexable wheel head whereon an outer surface grinding wheel and an inner surface grinding wheel are supported. The grinding machine is provided with positional relationship memory means for storing data indicating positional and angular relationships between the outer surface grinding wheel, the inner surface grinding wheel and the touch probe of the measuring device. The grinding machine also comprises position control means for initially positioning the workpiece base upon the output signal of the measuring device and then positioning the outer surface grinding wheel and/or the inner surface grinding wheel with respect to the workpiece based upon the data memorized in the positional relationship memory means.

With this configuration, both the outer surface grinding wheel and the inner surface grinding wheel can be positioned precisely with respect to the workpiece by using the common measuring device.

BRIEF DESCRIPTION OF THE ACCOMPANYING DRAWINGS

Various other objects, features and attendant advantages of the present invention will readily be appreciated as the same becomes better understood by reference to the following detailed description of preferred embodiments when considered in connection with the accompanying drawings, in which.

DETAILED DESCRIPTION OF THE PREFERRED EMBODIMENTS

Figure 1:
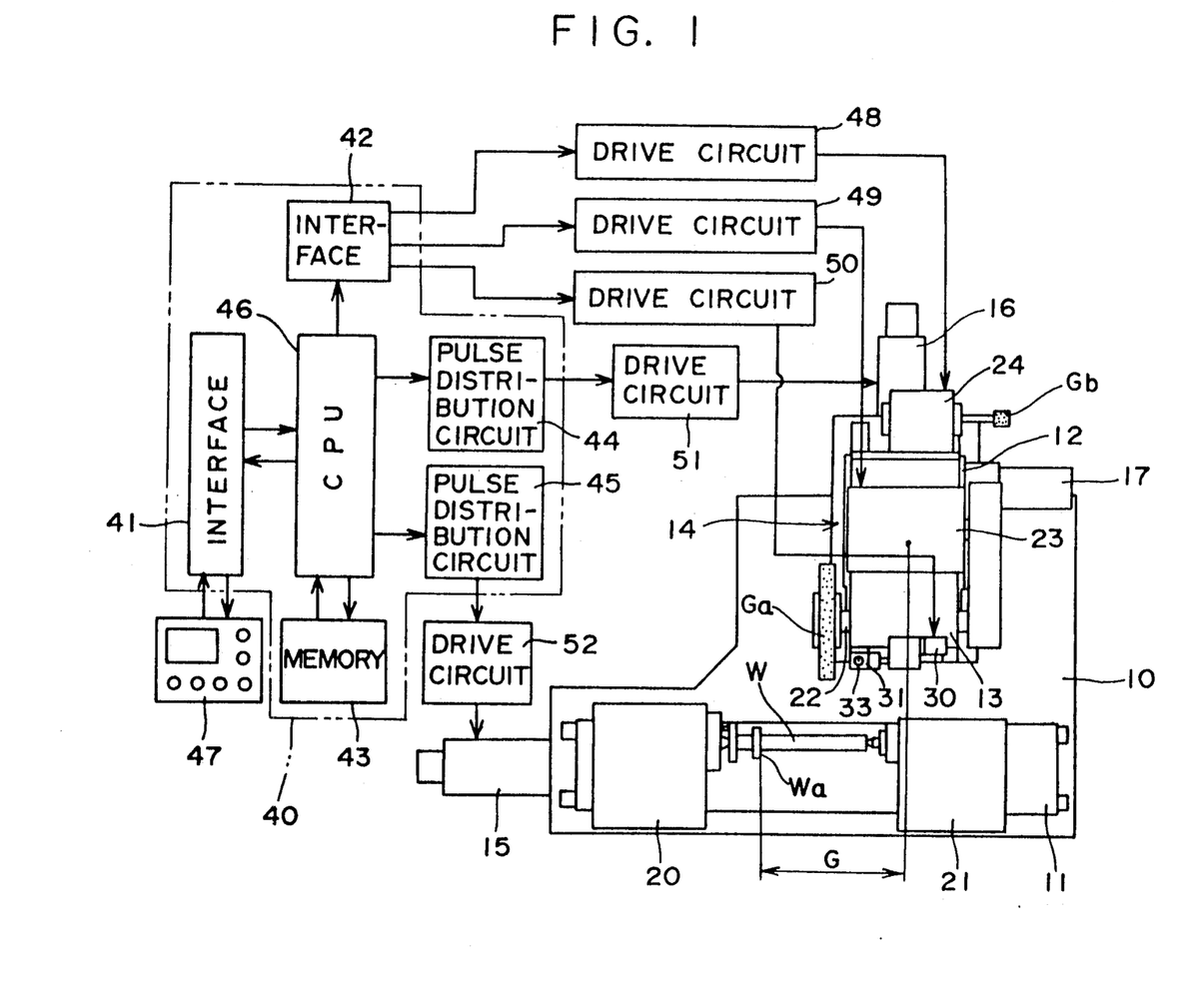
FIG. 1 is a schematic plan view of a grinding machine according to the first embodiment of the present invention, also showing a block diagram of a control circuit for the grinding machine.

Referring now to the drawing and particularly to FIG. 1 thereof, there is shown a bed 10 of a grinding machine according to the first embodiment of the present invention, on which a table 11 is guided to be movable along a first horizontal direction. Furthermore, a feed table 12 is guided on the bed 10 to be movable along a second horizontal direction perpendicular to the moving direction of the table 11, and a rotary base 13 is mounted on the feed table 12 to be indexable about a vertical index axis. The feed table 12 and the rotary base 13 compose a wheel head 14. The table 11 is moved by a servomotor 15 through a screw feed mechanism (not shown), and the feed table 12 is moved by a servomotor 16 through a screw feed mechanism (not shown). The rotary base 13 is rotated by a servomotor 17 through a gear mechanism (not shown).

A spindle head 20 and a tailstock 21 are mounted on the table 11 such as to face each other. A workpiece W is supported between the spindle head 20 and the tailstock 21 so as to be rotated about an axis parallel to the moving direction of the table 11.

On the rotary base 13, a wheel spindle 22 is supported to be rotated by a driving motor 23, and an outer surface grinding wheel Ga is removably attached on its outer end. On the rear side of the rotary base 13, a driving motor 24 is mounted, and an inner surface grinding wheel Gb is attached on its output shaft. Furthermore, a measuring device 31 is mounted on the front side of the rotary base 13 in order to be swung by a motor 30 about a horizontal axis, and the measuring device 31 is provided with a touch probe 33 engagable with a reference shoulder surface Wa of the workpiece W when the measuring device 31 is indexed to a location facing the workpiece.

The numeral 40 indicates a numerical controller which is composed of a central processing unit 46, a memory 43, pulse distribution circuits 44, 45 and interfaces 41, 42. An operation panel 47 with a cathode-ray tube is connected to the interface 41 in order to input machining programs, machining condition data and so on. Drive circuits 48, 49 and 50 are connected to the interface 42 in order to drive the driving motor 24, 23 and the rotation motor 30, respectively, in accordance with commands from the central processing unit 46. The interfaces 41, 42, the memory 43 and the pulse distributing circuits 44, 45 are connected to the central processing unit 46, and drive circuits 51, 52 for driving the servomotors 15, 16 are connected to the pulse distribution circuits 44, 45 in order to drive the servomotors 15, 16 in accordance with the pulses distributed by the pulse distribution circuits 44, 45. The servomotor 17 is also connected to the central processing unit 46 through a drive circuit and a pulse distribution circuit (not shown).

Figure 3:
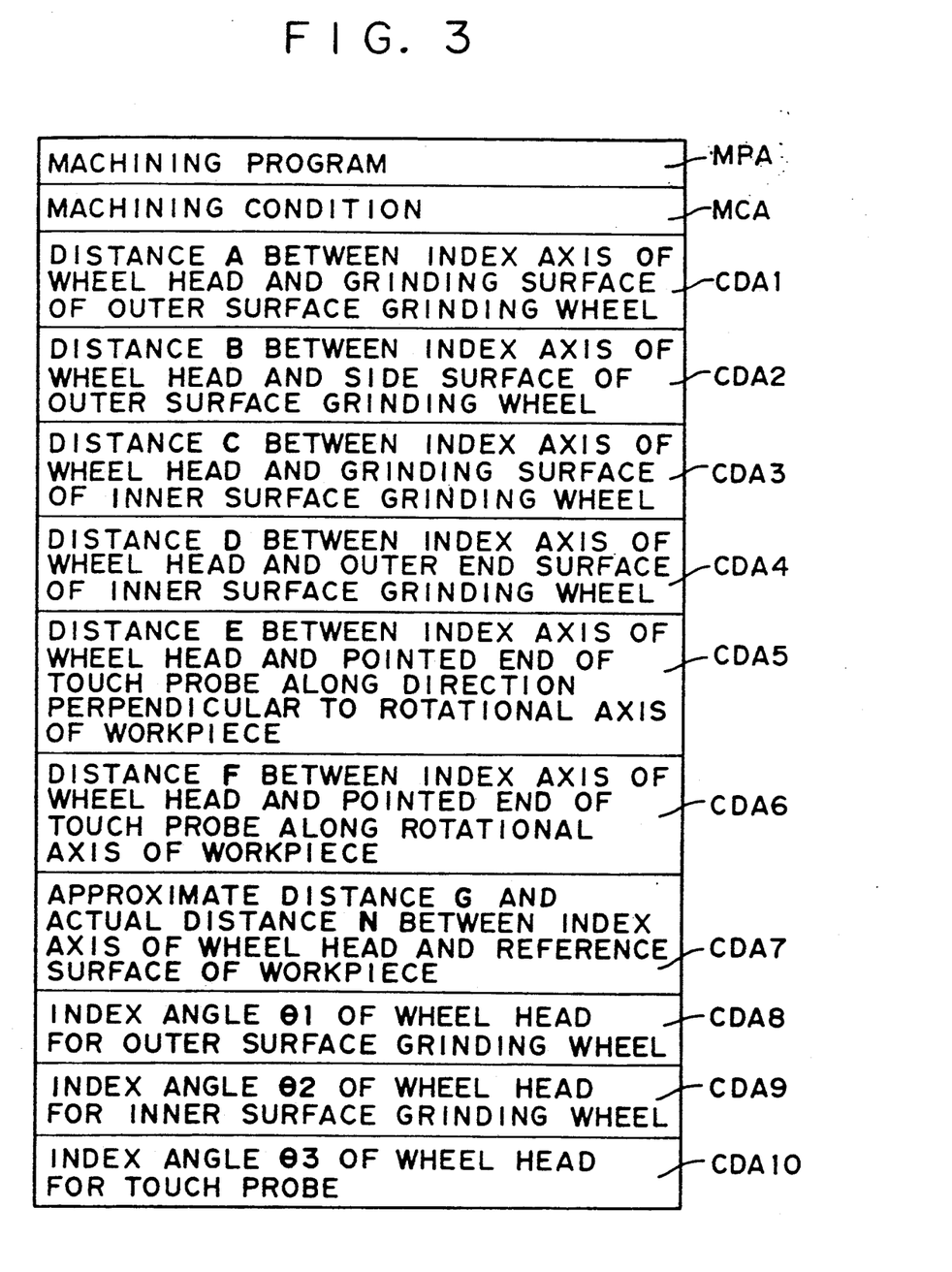
FIG. 3 is a memory map showing memory areas formed in the memory shown in FIG. 1.

In the memory 43, plural control data memory areas CDA1 through CDA10 are formed, as shown in FIG. 3, in order to memorize plural data indicating positional and angular relationships between the outer surface grinding wheel Ga, the inner surface grinding wheel Gb and the touch probe 33 of the measuring device 31, as well as a machining program memory area MPA and a machining condition data memory area MCA.

The memory areas CDA1 through CDA6 of the control data memory areas, which compose distance memory means, memorize data indicating distances between the outer surface grinding wheel Ga, the inner surface grinding wheel Gb and the touch probe 33. Namely, the memory areas CDA1 through CDA6 memorize a distance A along the moving direction of the feed table 12 between the index axis of the wheel head 14 and the grinding surface of the outer surface grinding wheel Ga, a distance B along the moving direction of the table 11 between the index axis of the wheel head 14 and the outer side surface of the outer surface grinding wheel Ga, a distance C along the moving direction of the feed table 12 between the index axis of the wheel head 14 and the grinding surface of the inner surface grinding wheel Gb, a distance D along the moving direction of the table 11 between the index axis of the wheel head 14 and the outer end surface of the inner surface grinding wheel Gb, a distance E along the moving direction of the feed table 12 between the index axis of the wheel head 14 and the pointed end of the touch probe 33, and a distance F along the moving direction of the table 11 between the index axis of the wheel head 14 and the pointed end of the touch probe 33. The memory area CDA7 memorizes an approximate distance G and an actual distance N along the moving direction of the table 11 between the index axis of the wheel head 14 and the reference shoulder surface Wa of the workpiece W.

On the other hand, the memory areas CDA8 through CDA10 of the control data memory areas, which compose angular position memory means, memorize a first index angle $\theta 1$ of the wheel head 14 whereat the grinding surface of the outer surface grinding wheel Ga faces the workpiece W, a second index angle $\theta 2$ whereat the grinding surface of the inner surface grinding wheel Gb faces the workpiece W, and a third index angle $\theta 3$ whereat the touch probe 33 faces the workpiece W.

Figure 2:
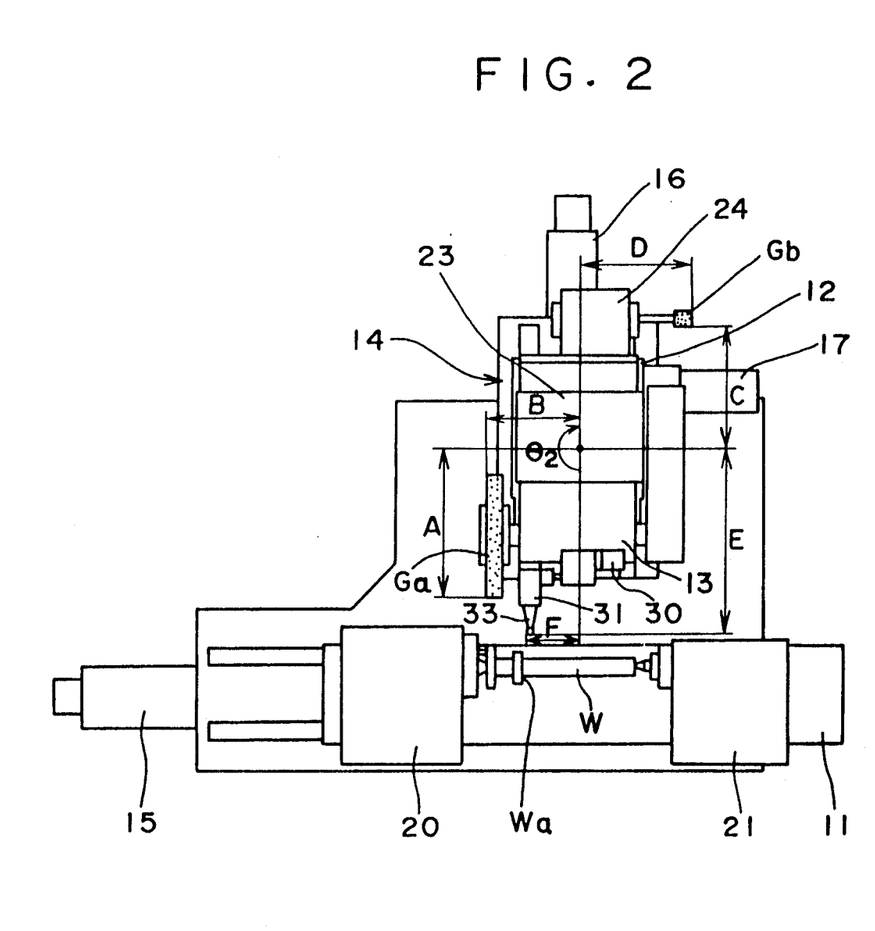
FIG. 2 is a schematic plan view of the grinding machine showing positional and angular relationships between the outer surface grinding wheel, the inner surface grinding wheel and the measuring device shown in FIG. 1.
Figure 4:
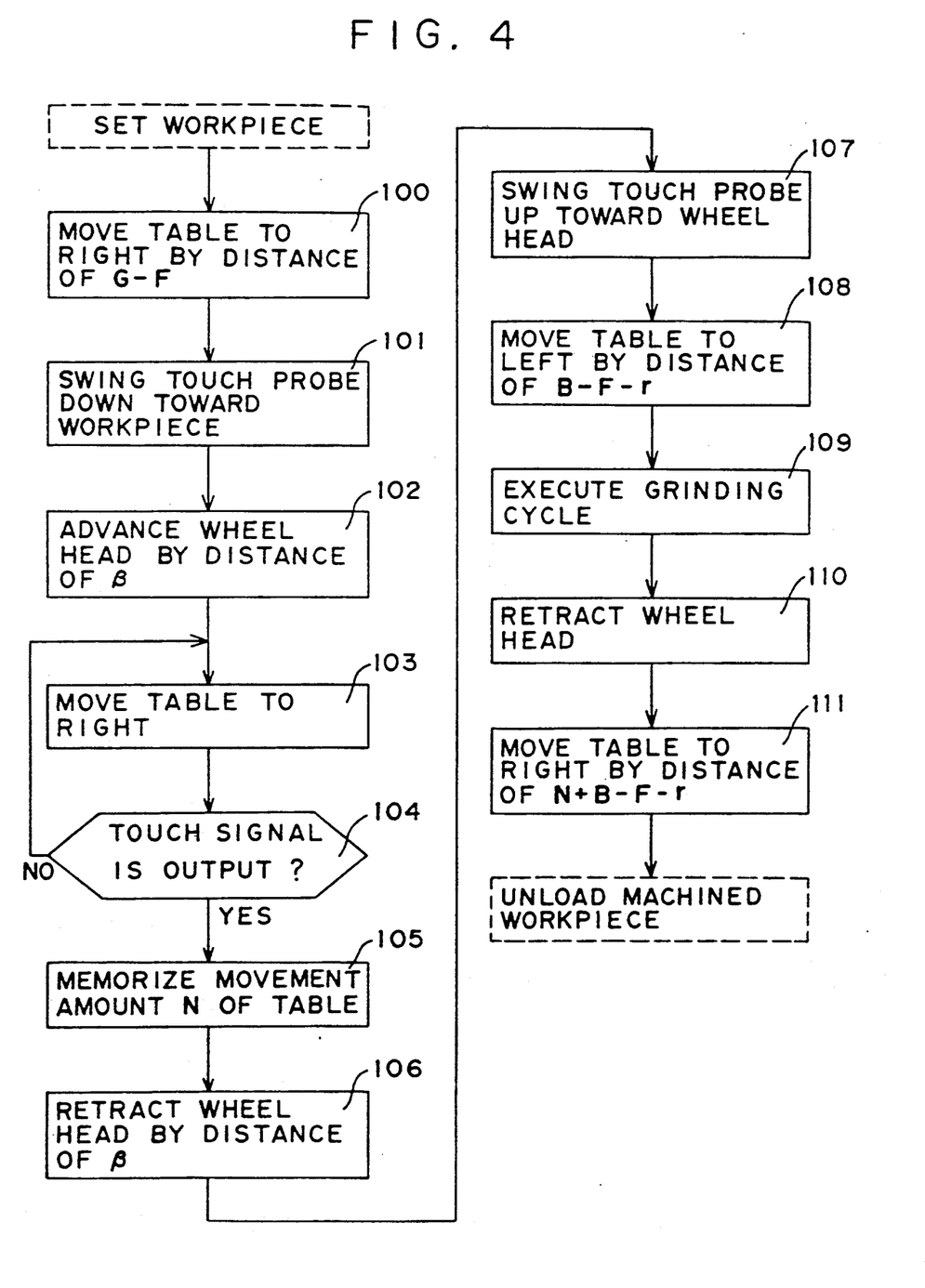
FIG. 4 is a flow chart illustrating the operation for outer surface grinding.
Figure 5A:
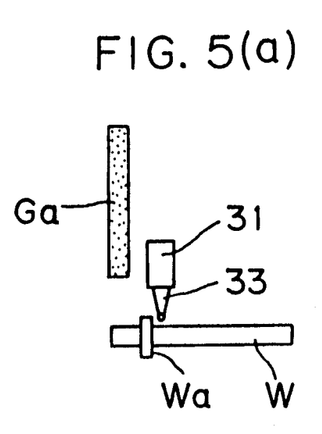
FIG. 5(a) through FIG. 5(d) are explanatory charts showing change in the positional relationship between the workpiece, the outer surface grinding wheel and the touch probe of the measuring device.
Figure 5B:
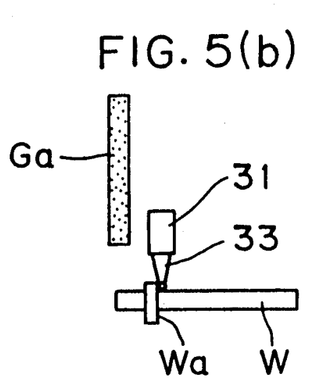
Figure 5C:
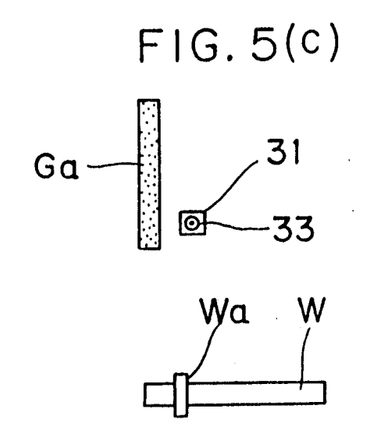
Figure 5D:
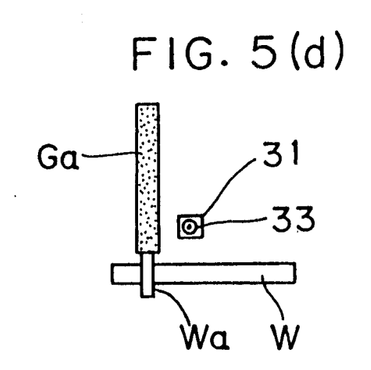

The operation of the grinding machine for the initial positioning of the workpiece and the outer surface grinding is now described with reference to the flow chart shown in FIG. 4 and the explanatory charts shown in FIG. 5(a) through FIG. 5(d). The workpiece W is set between the spindle head 20 and the tailstock 21 when the table 11 is located at a workpiece unloading position as shown in FIG. 1. The table 11 is first moved to the right by a distance equal to G-F (step 100), and the touch probe 33 is then swung down toward the workpiece W as shown in FIG. 2 (step 101). After that, the wheel head 14 is advanced by a distance $\beta$ such that the pointed end of the probe 33 faces the reference shoulder surface Wa of the workpiece W as shown in FIG. 5(a) (step 102), and the table 11 is moved to the right (step 103). When the touch probe 33 engages with the reference shoulder surface Wa as shown in FIG. 5(b), a touch signal is output from the measuring device 31 to the numerical controller 40. If the touch signal from the measuring device 31 is detected (step 104), the movement of the table 11 is stopped, and the movement amount of the table 11 is stored in the control data memory area CDA7 as an actual distance N (step 105). After that, the wheel head 14 is retracted by the distance $\beta$ (step 106), and the touch probe 33 is swung up as shown in FIG. 5(c). With this operation, the position of the workpiece W with respect to the index axis of the wheel head 14 is precisely detected. Thereafter, the table 11 is moved to the left by a distance equal to B-F-r (step 108). In the step 108, the moving amount of the table 11 is calculated based upon the positional data B, and F memorized in the control data memory areas CDA2 and CDA6 and a predetermined shift amount r of the table 11. A distance of B-F is equal to the distance between the outer side surface of the outer surface grinding wheel Ga and the touch probe 33, and the shift amount r is determined such that the center portion of the grinding surface of the grinding wheel Ga faces the outer surface of the workpiece W to be ground after the movement in step 108. Accordingly, the outer surface to be ground is precisely positioned regardless of the positional deviation of the workpiece with respect to the table 11. The wheel head 14 is then advanced in accordance with the predetermined feed cycle in order to grind the outer surface of the workpiece W (step 109), as shown in FIG. 5(d). Then the wheel head 14 is retracted (step 110), and the table 11 is moved to the right by a distance equal to N+B-F-r in order to move the table 11 back to its workpiece unloading position (step 111). After this operation, the workpiece W is unloaded.

Figure 6:
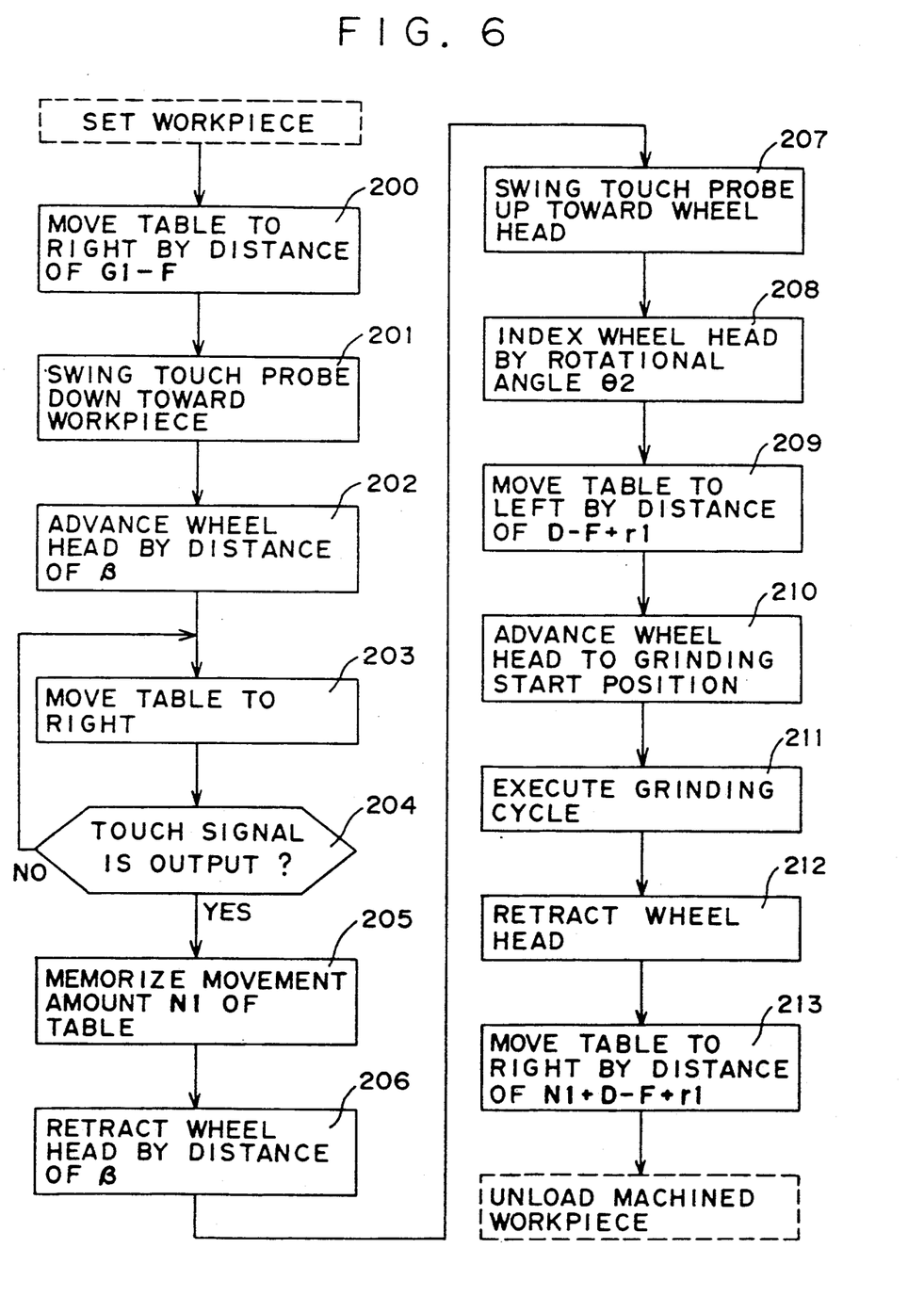
FIG. 6 is a flow chart illustrating the operation for inner surface grinding.
Figure 7A:
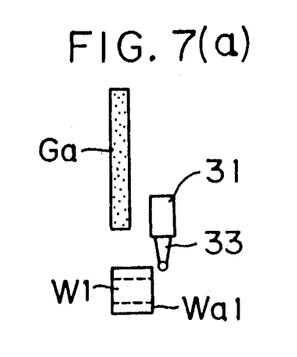
FIG. 7(a) through FIG. 7(f) are explanatory charts showing change in the positional relationship between the workpiece, the inner surface grinding wheel and the measuring device.
Figure 7B:
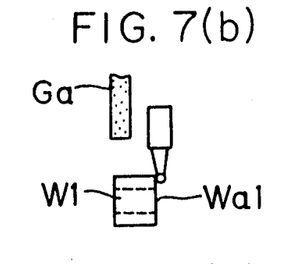
Figure 7C:
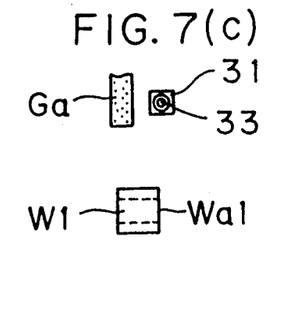
Figure 7D:
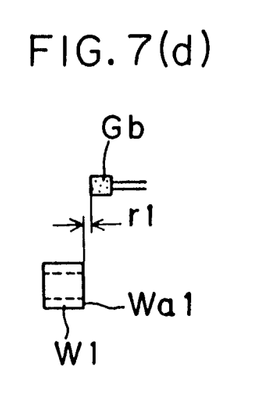
Figure 7E:
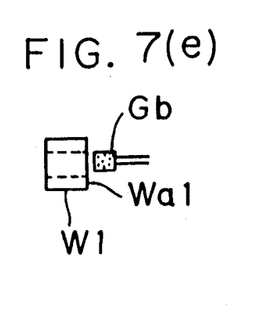
Figure 7F:
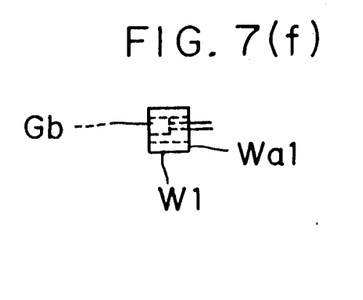

The operation of the grinding machine for internal grinding is now explained with reference to the flow chart shown in FIG. 6 and the explanatory charts shown in FIG. 7(a) through FIG. 7(f). A workpiece W1 is attached to the spindle head 20 when the table 11 is located at the workpiece unloading position as shown in FIG. 1. The table 11 is first moved to the right by a distance equal to G1-F (step 200), and the touch probe 33 is then swung down toward the workpiece W1 as shown FIG. 2 (step 201). The wheel head 14 is advanced by a distance $\beta$ such that the pointed end of the probe 33 faces the reference shoulder surface Wa1 of the workpiece W1 as shown in FIG. 7(a) (step 202), and the table 11 is moved to the right (step 203). When the touch probe 33 engages with the reference surface Wa1 as shown in FIG. 7(b), a touch signal is output from the measuring device 31 to the numerical controller 40. If the touch signal from the measuring device 31 is detected (step 204), the movement of the table 11 is stopped, and the movement amount of the table 11 is stored in the control data memory area CDA7 as an actual distance N1 (step 205). After that, the wheel head 14 is retracted by the distance $\beta$ (step 206), and the touch probe 33 is swung up as shown in FIG. 7(c) (step 207). With this operation, the position of the workpiece W1 with respect to the index axis of the wheel head 14 is precisely detected. Thereafter, the rotary base 13 is rotated by the amount of $\theta 2$ (180 degrees) to the second index position, and the table 11 is then moved to the left by a distance equal to D-F+rl (step 209) whereby the inner surface grinding wheel Gb is located at a position as shown in FIG. 7(d) such that a predetermined clearance rl exists between the front end surface of the grinding wheel Gb and the reference surface Wa1. Moreover, the wheel head 14 is advanced by a predetermined amount in order to move the grinding wheel Gb to a machining cycle start position, as shown in FIG. 7(e) wherefrom the grinding wheel Gb can be inserted into the workpiece W1 by a movement of the table 11 (step 210). Thereafter, the table 11 and the feed table 12 are relatively moved each other in accordance with the predetermined feed cycle in order to grind the inner surface of the workpiece W1 (step 211), as shown in FIG. 7(f). In the step 209, the moving amount of the table 11 is calculated based upon the positional data D and F memorized in the control data memory area CDA4 and CDA6, which indicate positional relationship between the inner surface grinding wheel Gb and the touch probe 33, and a predetermined shift amount rl of the table 11. Accordingly, the inner surface grinding wheel Gb can accurately be positioned at the starting position related to the workpiece W1 regardless of the positional deviation of the workpiece W1 with respect to the table 11, thereby the inner surface of the workpiece W1 being ground accurately. After this grinding operation, the table 11 is moved to the left in order to withdraw the grinding wheel Gb from the workpiece W1, and the wheel head 14 is then retracted to the position shown in FIG. 7(d) (step 212). After that, the rotary base 13 is indexed to the original index position ($\theta=0$) by being rotated by 180 degrees, and the table 11 is moved to the right by a distance equal to N1+D-F+rl in order to be moved back to the workpiece unloading position. After this operation, the workpiece is unloaded. The values $\beta$, r, and rl are programmed in the machining program.

As explained above, the outer surface grinding wheel Ga and the inner surface grinding wheel Gb can be positioned with respect to the workpieces W, W1 with using the common measuring device 31.

Figure 8:
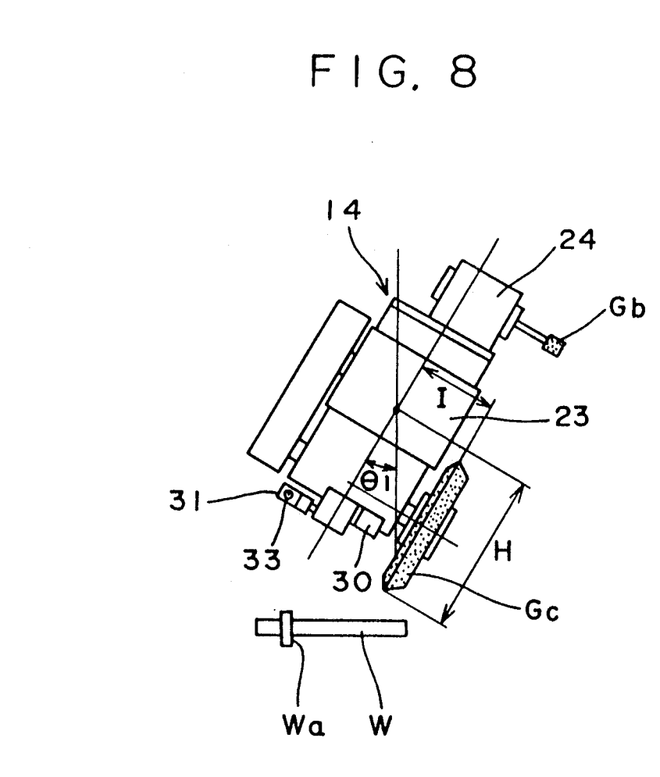
FIG. 8 is a schematic plan view of the wheel head according to the second embodiment of the present invention, which is provided with an angular grinding wheel and an inner surface grinding wheel.

FIG. 8 shows schematic plan view of the wheel head 14 according to the second embodiment of the present invention, which is provided with an angular grinding wheel Gc thereon. In this case, a distance I along the center axis of the wheel spindle between the index axis of the wheel head 14 and the top portion of the angular grinding wheel Gc, and a distance H along a direction perpendicular to the center axis of the wheel spindle between the index axis of the wheel head 14 and the top portion of the angular grinding wheel Gc are also stored in the memory 43 as well as an index position $\theta 1$ of the rotary base 13 whereat the angular grinding wheel Gc faces the workpiece W. A distance A is calculated by the central processing unit 46 with using the expression of $A = H \cdot \cos\theta 1 + I \cdot \sin\theta 1$, and a distance B is calculated by the central processing unit 46 with using the expression of $B = H \cdot \sin\theta 1 + I \cdot \cos\theta 1$. The distance A is stored in the memory area CDA1 as a distance between the index axis of the wheel head 14 and the grinding surface of the outer surface grinding wheel, and the distance B is stored in the memory area CDA2 as a distance between the index axis of the wheel head 14 and the side surface of the outer surface grinding wheel. With this arrangement, the angular grinding wheel Gc can accurately be positioned based on the position of the reference surface Wa of the workpiece W.

In the above embodiment, the index axis of the rotary base is used as a common reference point, and the positions of the grinding wheels and the touch probe of the measuring device with respect to the common reference point are memorized in the memory. Therefore, the distances between the touch probe and the grinding wheels are calculated during the grinding operation. However, the distances between the touch probe and the grinding wheels can directly be memorized in the memory. In this case, calculations during the grinding operation can be simplified.

Obviously, numerous modifications and variations of the present invention are possible in light of the above teachings. It is therefore to be understood that within the scope of the appended claims, the invention may be practiced otherwise than as specifically described herein.

What is claimed is:

1. A grinding machine capable of grinding outer and inner surfaces of a workpiece comprising:
   a supporting mechanism for supporting said workpiece in order to rotate said workpiece about a horizontal axis;
   a feed table movable relative to said supporting mechanism;
   a wheel head supported on said feed table to be indexable about a vertical index axis;
   an outer surface grinding wheel supported on said wheel head to be rotated by a motor;
   an inner surface grinding wheel supported on said wheel head at a different location from that of said outer surface grinding wheel to be rotated by a motor;
   first driving means for relatively moving said feed table in a first horizontal direction parallel to said horizontal axis and a second horizontal direction perpendicular to said horizontal axis;

second driving means for indexing said wheel head about said index axis;

a measuring device mounted on said wheel head and having a touch probe engagable with a reference surface of said workpiece when said measuring device is indexed to a position facing said workpiece, said measuring device outputting a signal when said workpiece is moved to a predetermined reference position, thereby causing said touch probe to engage with said reference surface of said workpiece;

memory means for storing first data indicating a first distance between said touch probe of said measuring device and said index axis of said wheel head, second data indicating a second distance between said outer surface grinding wheel and said index axis, and third data indicating a third distance between said inner surface grinding wheel and said index axis;

indexing control means for indexing said wheel head by actuating said second driving means to selectively move one of said outer surface grinding wheel, inner surface grinding wheel and measuring device to said position facing said workpiece; and position control means for controlling relative positioning between said inner and outer surface grinding wheels and said workpiece, comprising, first means for initially moving said workpiece to said predetermined reference position using said first data stored in said memory means and said signal from said measuring device under the condition that said measuring device is in said position facing said workpiece, second means for relatively moving said wheel in said first horizontal direction with respect to said workpiece by actuating said first driving means by a first amount calculated based upon said first and second data memorized in said memory means, under the condition that said outer surface grinding wheel is in said position facing said workpiece so as to grind said outer surface of said workpiece, and third means for relatively moving said wheel head in said first horizontal direction with respect to said workpiece by actuating said first driving means by a second amount calculated based upon said first and third data memorized in said memory means, under the condition that said inner surface grinding wheel is in said position facing said workpiece so as to grind said inner surface of said workpiece.

2. A grinding machine as set forth in claim 1, wherein said memory means further comprises first angular position memory means for memorizing a first angular position whereat said touch probe faces said workpiece, second angular position memory means for memorizing a second angular position whereas said outer surface grinding wheel faces said workpiece, and third angular position memory means for memorizing a third angular position whereat said inner surface grinding wheel faces said workpiece, and wherein said indexing control means indexes said wheel head using said first, second and third angular positions memorized in said first, second and third angular position memory means, respectively, to selectively move one of said outer surface grinding wheel, inner surface grinding wheel and touch probe to said position facing said workpiece.

3. A grinding machine capable of grinding outer and inner surfaces of a workpiece comprising:

a table movable along a first horizontal direction;

a supporting mechanism mounted on said table for supporting said workpiece in order to rotate said workpiece about an axis parallel to said first horizontal direction;

a feed table movable along a second horizontal direction perpendicular to said first horizontal direction;

a wheel head supported on said feed table to be indexable about a vertical index axis;

an outer surface grinding wheel supported on said wheel head to be rotated by a motor;

an inner surface grinding wheel supported on said wheel head at a different location from that of said outer surface grinding wheel to be rotated by a motor;

first driving means for relatively moving said table in said first horizontal direction and said feed table in said second horizontal direction perpendicular to said first horizontal direction;

second driving means for indexing said wheel head about said index axis;

a measuring device mounted on said wheel head and having a touch probe engagable with a reference surface of said workpiece when said measuring device is indexed to a location facing said workpiece, said measuring device outputting a signal when said workpiece is moved to a predetermined reference position, thereby causing said touch probe to engage with said reference of said workpiece; and a numerical controller having a memory for storing first data indicating a first distance between said touch probe of said measuring device and said index axis of said wheel head, second data indicating a second distance between said outer surface grinding wheel and said index axis and third data indicating a third distance between said inner surface grinding wheel and said index axis, said numerically controller initially moving said workpiece to said predetermined reference position using said first data stored in said memory and said signal from said measuring device under the condition that said measuring device is in said position facing said workpiece, relatively moving said wheel head with respect to said workpiece by actuating said first driving means by an amount calculated based upon said first and second data memorized in said memory under the condition that said outer surface grinding wheel is in said position facing said workpiece so as to grind said outer surface of said workpiece, and relatively moving said wheel head with respect to said workpiece by actuating said first driving means by an amount calculated based upon said first and third data memorized in said memory under the condition that said inner surface grinding wheel is in said position facing said workpiece so as to grind said inner surface of said workpiece.

4. A grinding machine as set forth in claim 3, wherein said outer surface grinding wheel is an angular grinding wheel; said memory further memorizes auxiliary data indicating a distance along the rotational axis of said angular wheel and a distance along the direction perpendicular to said rotational axis of said angular grinding wheel between the grinding surface of said angular grinding wheel and said index axis of said wheel head; and said numerical controller calculates said data indicating positional relationship between said angular grinding wheel and said touch probe of said measuring device based on said auxiliary data.

* * * * *